Jan. 23, 1934.    V. DAHLMAN    1,944,407
AIR FILTER
Filed Dec. 31, 1930
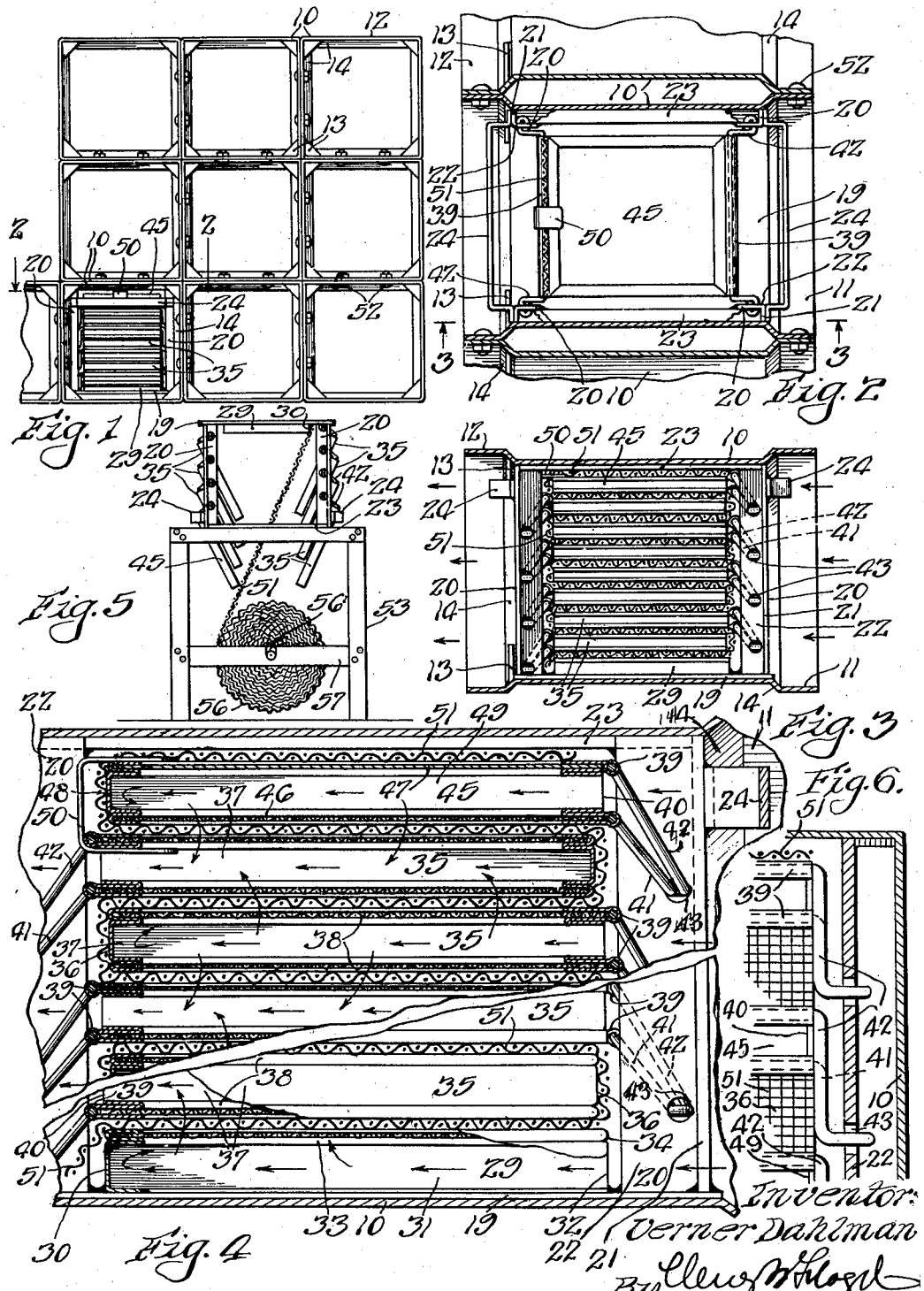

Patented Jan. 23, 1934

1,944,407

UNITED STATES PATENT OFFICE 1,944,407

AIR FILTER

Verner Dahlman, New Lenox, Ill., assignor to Independent Air Filter Company, Chicago, Ill., a corporation of Illinois Application December 31, 1930
Serial No. 505,700

14 Claims. (Cl. 183—71)

The present invention has to do with air filters and relates particularly to a filter in which a dry fabric sheet form is used.

The filtering of air is by no means a novelty. For many years air has been passed through fabric of various characteristics for the purpose of purifying such air. Some of the earliest forms of filters for air utilized fabrics of fine or close texture but porous enough to admit of the passage of the air therethrough freely.

For this specific purpose, various kinds of fabrics possess useful characteristics. Among these are cheese-cloth, canton flannel, towelling, diaper cloth, wool felt, cotton wadding, asbestos cloth, felted jute, felted wood fibre, and wood pulp cellulose in a plurality of layers.

Each of the materials named and such other materials as have been used for the purpose indicated possess certain inherent qualities. For specific uses, certain of the materials named have highly desirable qualities, while for another purpose other of the materials are superior. The better practice of the present day is to select the specific material which for the object in view possesses the greatest number of advantages and the fewest disadvantages.

In the present invention, any one of the materials hereinabove named may be employed, it being necessary only to form the filtering material into a sheet capable of being rolled or packaged for convenience in transportation and handling.

The primary object of the present invention is to take full advantage of the remarkable air filtering qualities inherent in the fabrics named and to other materials suitable for air filtration. The present invention aims to concurrently overcome the objections which have heretofore prevented the more general use of air filters and of the materials naturally adapted for air filtration.

It is elementary in the art of filtering air by this method that the velocity of an air current through a fabric medium must be relatively low. In this respect, air filtering through fabric differs essentially from the so-called "impingement" method of air filtration, in which latter method the air is forced to pass through a coarse maze of filaments, usually metallic in nature and usually coated with an adhesive liquid such as oil.

In the impingement method of air filtration, the "cleaning" of the air is obtained by causing the dust particles in the air to impinge violently against an adhesive surface, the adhesive retaining the dust particles and allowing the air to move through freed of mechanical impurity.

Obviously, the impingement method of filtration not only permits of a high air velocity through the air filter, but for greatest efficiency an oil filter of this type actually depends upon very high air velocity.

In the so-called "dry" air filters, high air velocity is impracticable. The texture of the filtering material necessarily has relatively small pores. At high velocity, the resistance to air flow could be objectionable, and the dust particles would be made to penetrate the fabric. The texture of the filtering medium and the pores thereof would fill rapidly with the dust particles driven forcibly thereinto, thereby clogging the filtering medium.

There is no exact standard determining the velocity of air permissible through any fabric. The permissible velocity of the air depends to a considerable extent upon the nature of the fabric itself. Another factor in determining the appropriate air velocity is the type of dust to be removed from the air and the quantity of such dust contained in or carried by the air to be filtered.

For example, canton flannel may be used as the arresting or filtering medium in atmosphere containing a heavy concentration of dust. Under such conditions, air velocities as low as two lineal feet per minute are frequently employed. This velocity may be increased if the concentration of dust is in a lesser degree or if a filtering medium is selected which possesses a more open character.

In the cleaning of ordinary atmospheric air, where it is not necessary to stop the microscopic particles of dust, a velocity of 20 to 30 feet per minute is not objectionable. In between these extreme velocities, namely, from two feet a minute to thirty feet a minute, the most efficient velocity must be determined by actual test made under working conditions.

Several facts stand out in respect to dry air filters using media of the character herein described or similar media. One of these facts is that a fabric medium will filter effectively regardless of how low the velocity of air through the medium. A second fact is that the lower the velocity of the air to be filtered, the less will be the penetration of dust particles into the texture or body of the filtering fabric.

Another fact developed from practice is that when the air velocity is very low, the dust particles will remain in the nap of the fabric employed and eventually these arrested dust particles will gradually build up a filter mat of themselves with the result that resistance to air flow will be developed very slowly and the useful life of the filter medium thus greatly lengthened.

A fourth fact learned by observation of fabrics in air filters is that the benefits to be derived from low velocity are much greater than in direct proportion to such velocity. It may be said that the benefits to be obtained by low air velocity follow more nearly along the lines of the law that "resistance to air flow varies as the square of the velocity."

A natural consequence or deduction which may be had from a consideration of the several facts hereinabove recited is that in order to make practical use of a fabric filter medium and obtain highly efficient results therefrom, the air velocity must be kept as low as possible.

In order to handle a considerable volume of air at low velocity, there must be provided a filter with an extensive area of filter medium. Heretofore, the conventional method employed for providing large area for a filter has been to arrange a filter fabric in long folds parallel to one another and to the direction of the air flow, or in a zig-zag form and nearly parallel to the air flow, so that while the velocity of the air may be fairly high where it enters the filter, it is slowed down enormously as it passes through the fabric. The conventional devices for filtering air do not contemplate renewal of the fabric filter except at long intervals, as for example, one or more years.

Because of this need for large filtering area, a filter in which the filter medium can not be readily changed requires an excessive amount of space. Likewise, the conventional apparatus of the present day, because of its bulkiness and its complicated structure, is excessively high in cost. A further disadvantage of the conventional type of air filter resides in the difficulty and expense of making renewals of the filter medium.

Thus the field into which air filters have been introduced has been limited and these conditions have retarded the rapid growth of air filtration, notwithstanding the generally known advantages to be obtained by the employment of filtered air not only in the home but for many industrial uses.

The herein described apparatus adheres closely to the established principles above recited in the matter of providing extensive area for the filter medium. It provides, however, such convenient means for renewing the filter fabric that the servicing of the apparatus possesses no objectionable features.

While the instant apparatus provides ample filtering area in compact form, it renders unneccessary the provision of an excessive amount of filtering area because the renewal of the filter medium may be accomplished more readily in the instant apparatus than in other devices, all of which devices have a filtering medium incorporated into them more or less permanently.

In the instant instrumentality, much higher air velocities may be employed than when the filter medium is permanent. The result is that the installation is thereby greatly reduced in size and in initial cost. The ease of renewal of the filter material makes it possible to keep the entire filtering equipment in a constant state of high efficiency, as opposed to a system which is moving from its highest efficiency gradually toward a point which may be called its break-down point. There can be no approach to a state of break-down in a system made up of the filtering unit herein which is easily recharged with filter medium.

Another distinct advantage in the instant apparatus lies in the fact that such apparatus enables the use of an exceedingly cheap but effective filtering medium, such as, for example, wood pulp cellulosic fibre in tissue like layers. In place of such material, common cotton wadding may be employed. It is also adapted to use any form of sheet material as a filter medium.

The instant device, by providing a unique method of folding a continuous strip of filter material makes it possible to use very flimsy filter materials, such as the two which have been mentioned, or any other filter medium having only sufficient tensile strength to stand unwinding from a roll or removal from another package.

In recapitulation, it is said that the advantages of the instant apparatus and its uniqueness depend upon the fact that it provides an extensive area of filtering fabric while the device is in compact form, and the device at the same time provides a highly convenient means for renewal of the filter material, the renewal being obtainable with such little effort that the system may be kept in a constant state of high efficiency.

The additional objects of the invention include a unique compact arrangement of spacer elements whereby to facilitate the spreading of a filtering medium over a large area, without the occupation of large cubical space by the filter; a new and unique unit for a dry filter medium in strip or roll form and having means for readily folding the said strip into parallel or substantially parallel layers, generally in parallelism with the flow of the air; an improved filter unit having a plurality of spacer elements permanently but movably attached thereto; a unique means for arranging and mounting spacer elements in a filter unit; an improved form of filter spacing elements; and a new and unique system of arrangement of spacer elements in a filter for facilitating the use of a strip or roll of filter medium.

These objects, and such other objects, as may hereinafter appear, are obtained by the novel construction, unique arrangement, and improved combination of elements, all of which elements are illustrated in the accompanying single sheet of drawing showing two forms of the invention.

In said drawing:

Figure 1 is a front or back elevation of a filter installation comprising a battery of filter units associated together;

Figure 2 is a horizontal section on the line 2—2 of Figure 1 looking in the direction of the arrows and illustrating one filter and parts of others;

Figure 3 is a vertical section taken on the line 3—3 of Figure 2 looking in the direction of the arrows;

Figure 4 is an enlarged fragmentary transverse section with parts broken away to illustrate the hinge arrangement of the spacer elements employed and the course of air therethrough;

Figure 5 is an end elevation of a loading stand with a filter such as is herein described disposed thereon, in inverted position and ready to be discharged and loaded; and Figure 6 is a fragmentary end detail showing the manner of mounting rods 41—42.

Like reference characters are used to designate similar parts in the drawing and in the description hereinafter given.

In the present form of the invention, a plurality of filter units may be employed in a frame or housing. At least two ways of arranging these units transversely of an air conduit or duct may be employed. One of these methods comprises the employment of vertical and horizontal angle irons having horizontal shelves at spaced intervals, the angle irons themselves being properly spaced to admit a single filter unit between pairs of adjacent vertical and horizontal angle irons. In such an arrangement each filter unit is closely fitted against the angle irons and a suitable seal between the frame and filter unit is provided.

A second method of mounting filter units is to provide each unit with a housing and then arrange a plurality of independent housings in a group, securing them one to another so as to form a rigid frame and of suitable dimensions. Said casings, later described, may be joined together in any suitable manner either through their bodies or in the flange sections thereof. A single filter unit is adapted to be removably secured in each casing or housing.

Each casing or housing 10 comprises a generally rectangular metallic or other shell having flanges 11 at its front and flanges 12 at its back. In the corners of the flanges 12 at the rear, triangular members 13 are suitable secured to act as stops for a filter unit, shortly to be described. Other types of stops may be used, and the flow of air may be in either direction through the housing. The flanges 12 at the rear and flanges 11 at the front may be formed in any suitable manner, such flanges generally having outwardly extending shoulder sections 14.

Across any wall of the housing, generally the top, there may be "seals", generally flexible members to obtain an air tight closure between filter unit and casing. As seals are conventional, and their position a matter of choice, their inclusion in the drawing in this application has been considered unnecessary.

Each filter unit comprises a base 19 of sheet metal or other suitable material. At each corner of said base 19 there is an angle iron 20, the short wing 21 of which angle irons form the front and back edges of the filter. The longer wing 22 of said angle irons 20 projects inwardly from the outer edges of said base 19, of course, a channel iron may be substituted for an angle iron, and other uprights could be selected.

At the top of the filter unit, there are two strips 23, each joining a front and a back angle iron 20, leaving the intermediate top of the device open. Adjacent each top corner of the filter frame, there is a transverse reinforcing strip 24 which is in the form of a round tube, said tube member extends from one narrow flange 21 to the opposite narrow flange 21. Said member at its closed side projects outwardly of the filter frame in a horizontal plane to clear the spacers, later to be described, when said spacers are in open position.

A bottom cell or spacer 29 is secured upon the base 19 by any suitable means. Said spacer is arranged between the uprights 20. There is no air passage between the attached side of the material of said spacer 29 and the base 19 itself. Said spacer member 29 comprises a closed back 30 and two closed sides 31 with an open front 32. The top 33 thereof has a foraminous section, the front edge 34 of the member being beaded. Said front edge may be turned upwardly to provide an overlapping lip in relation to the next adjacent and movable spacer element, but this is not essential.

Above the fixed spacer 29 is a movable spacer 35 comprising a closed back 36, closed sides 37, and foraminous tops and bottoms 38.

Beaded front edges 39 are at the open side 40 of said spacer. The bottom lip 39 depends along the top of the closed back 30 of the stationary spacer 29. The upper overlapping front edge 39 may be turned upwardly if desired and provide an overlapping portion with respect to the closed back of the next movable spacer 35 thereabove. The structure of said upper member 35 is the same as that of spacer 35 and it is similarly designated.

In the beads 39 at the open side of each spacer element 35, as illustrated, there are rods or wire supports 41 and 42. Other fastening members may be employed, such, for example, as a flat steel stamping, so long as the spacers 35 are hinged and held captive. Said supports 41 and 42 may comprise bent wire or rod-like material adapted to project inwardly of the beads at the open side of the spacer elements 35. The members 41 and 42 converge in the direction of the base 19. Said members 41 and 42 are brought together so that the converged ends thereof may be jointly seated in a single aperture at each side of the frame. The converging material of said members may be bent at an angle of ninety degrees and made to conjointly project through an aperture 43 in the flange 22 of the upright angle irons 20 to provide a pivotal or hinged support at each side of the frame for each movable spacer member 35. Said spacers are thus held captive and at the same time relatively movable about an axis for convenience in loading and unloading the device.

The next succeeding or contiguous spacer member 35 is of the identical structure of the member 35 just described and is mounted in the same manner and with supports 41 and 42 of the same length. The mounting of such member, however, is at the opposite side of the device and in the opposed pair of angle irons 20. Thus the movement of the spacers is in each instance the same, and the spacers are staggeredly arranged in the frame.

Spacers 35, like those described, extend upwardly one above another in alternate arrangement to the top of the filter. The top spacer 45 differs from the spacers 35 in that it has a foraminous inner face 46 and a closed outer face 47. Said spacer 45, therefore, has a closed back 47, a closed back 48, and closed sides 49 with a foraminous face 46. Said spacer 45 possesses beaded edges of the same character as those possessed by the other spacer elements 35 and is mounted upon identical members 41 and 42.

To secure the several movable spacers in a closed position and in parallelism with the stationary spacer, a clip 50 in the form of a spring-like U-shaped member may be employed. Said member 50 engages the internal wall of the outermost face of the top spacer element 35 and the closed face 47 of spacer 45, said clip engaging any filter material which may be upon the face 47.

When the filter is charged with a filter medium 51, the unit may be seated in a cell 10 such as previously described. The open top of the filter is usually at the top of the casing 10 and the closed base 19 is at the bottom of casing 10. The unit can be used in inverted position or with the spacers in vertical alignment in place of horizontal alignment, when desired. Suitable sealing elements, means or strips (not shown) are provided at each side of the filter unit either on the unit or in the casing. At the bottom of the device or on base 19 any suitable seal may be employed. Said several seals are used to make certain that there will be no leakage of air between the casing 10 and the filter.

The filter, when loaded, is forced inwardly of the casing 10 until the back edges thereof engage the stops 13 or other stops at the four corners of the casing 10. In securing casings 10 one to another, bolts 52 may be employed as shown in Figure 2.

For loading and unloading the filter, a service frame 53 is useful (see Figure 2). Said frame comprises suitable uprights and transverse members having a supporting surface adapted to receive the top strips 23 of the filter when said filter is inverted. The filter is held firmly against movement when it is disposed in said servicing frame.

To unload, the clip 50 is removed from the filter. Instantly, the various movable spacers 35 and spacer 45 drop downwardly, the filter being in inverted position. Filter material in strip form therebetween will drop out of its own weight or it may be dislodged manually.

Clean filter material may be inserted between the spacers 35 and 45 until such material 51 extends to the closed back 30 of the stationary spacer 29 where such material 30 may be secured by locks or any suitable fastening members (not shown), generally a long clip attached to the frame. Thereupon each spacer member 35 and spacer 45 in regular order is brought into horizontal position, thus forming parallel spaced apart folds in the filter material 51. The material 51 external to the filter is cut off from a roll or package 56 after the strip taken therefrom covers the last foraminous face of the adjacent spacer 35. The clip 50 is then attached and the filter is ready to be placed into a housing 10 therefor.

For loading, however, the filter may be turned right side up, that is, stood upon the service rack. The movable spacer elements 35 and 45 are kept in angular open position by suitable means until the filter material 51 is in position thereabout and therebetween whereupon each spacer 35 and spacer 45 is permitted to drop, one at a time, into proper horizontal position. Such assembly forces the filter material 51 into proper position, and each spacer element is allowed to drop into position without disturbing or releasing those thereabove.

Suitable manually controlled means may be provided whereby each spacer element may be held in open position to be released one at a time and in proper and regular order, or unitary means for controlling the release thereof in predetermined order may be supplied. When the device is completely loaded, the filter material 51 is cut off, the clip 50 placed in position, and the filter slidably seated into a casing 10.

The filter material 51 may come in rolls adapted to be wound on a core 56, which core in turn may be journalled in side members 57 in the servicing stand.

The spacers 29, 35, and 45, instead of being parallelepiped, may be triangular in transverse section. When so shaped, said members are supported at their open side. The open side has lips to receive wire supports or the spacer is equipped with a hinge member of suitable type. The arrangement of such spacer members in a filter is in alternate order with open sides being alternately oppositely disposed.

I claim:

1. An air filter unit comprising a supporting member, spacer elements connected to said supporting member, connecting means intermediate said elements and said supporting member admitting of said elements being arranged in substantial parallelism or angularly in respect to said supporting member, said elements being arranged in two opposed series, the elements of the opposed series being similarly shaped and reversed, the members of said series being alternately disposed when said filter is in operable condition, and a continuous strip of filter material extending from the bottom of said filter to the top thereof intermediate the elements of the opposed series, the filter material being supported on opposed surfaces by opposed spacer elements.

2. An air filter comprising a supporting member, a plurality of similarly shaped spacer elements arranged in series, each series being movably attached to said supporting member, said spacer elements being angularly movable with respect to one another and arrangeable with a member of one series alternating with a member of the other series to provide a tortuous path for a continuous strip of filter material, and a strip of filter material intermediate the members of opposed series of spacer elements, the opposed sides of said filter being supported by spacer elements of opposed series.

3. An air filter comprising a supporting member, opposed series of similar spacing elements, each of said elements having an external surface for the support of filter material and being arranged transversely of the filter unit, the area of each transverse supporting surface of a spacer element being substantially equal to the transverse cross section of the filter unit, means for movably attaching the spacing elements to said supporting member and admitting of angular arrangement of said spacer elements or arrangement in substantial parallelism with the members of one series alternating with the members of the other series, and a strip of filter material extending from the bottom to the top of said unit intermediate the spacer elements of opposed series, said filter material being supported on its opposite sides by members of opposed series.

4. An air filter comprising a frame, spacer elements connected to said frame and angularly movable relative thereto, the spacer elements being similar in size and shape and being arranged in opposed series, connecting means intermediate the frame and the spacer elements permitting of the members of opposed series being separated in one position and arranged in substantial parallelism with members of opposing series alternating in another position, and a strip of filter material extending from the bottom to the top of the unit and supported on opposite sides by spacer elements of opposed series.

5. In an air filter, a retaining member, spacing elements on said retaining member, each of said spacing elements having a surface for supporting filter material of an area substantially equal to the transverse cross section of the filter, connecting means from said retaining member to said elements admitting of said elements being arranged in parallelism or in angular position, and a strip of filter material intermediate adjacent spacing elements.

6. In an air filter, a frame having opposed sides, spacing elements intermediate said opposed sides, each of said spacing elements having a filter material supporting area substantially equal to the transverse cross section of the filter, connecting means between said elements and said frame, alternate elements being connected to opposite sides of said frame, and a strip of filter material intermediate adjacent spacing elements.

7. In an air filter, a frame, spacing elements, hinge-like connectors intermediate said frame and elements, and filter material upon said spacer elements.

8. In an air filter, a frame, spacer elements, a connector intermediate said frame and each of said spacer elements admitting of pivotal movement of said spacer elements, and filter material disposed upon each of said spacer elements.

9. In an air filter, a frame having sides, spacer elements on said frame, each of said spacer elements having a filter material supporting area substantially equal to the transverse cross section of the filter, connecting means for alternate elements to opposite sides of said frame to admit of the arrangement of said elements in substantial parallelism or the separation thereof whereby to provide a continuous open space intermediate to said sides, and filter material disposed upon each of said spacer elements.

10. In an air filter, a frame having opposed sides, spacing elements hingedly connected to said opposed sides, and filter material intermediate adjacent spacing elements.

11. In an air filter, a frame having opposed sides, spacing elements hingedly connected to said sides, means for locking said elements in contiguity one with another, and filter material intermediate said elements.

12. In an air filter, a frame having opposed sides, spacing elements hingedly connected to the opposed sides of said frame, alternate spacing elements being attached to opposite sides, filter material intermediate said spacing elements, and a locking member engaging one of said elements to secure all of said elements in aligned association.

13. A filter unit having a filter medium in strip form arranged in zig-zag layers and comprising a base, and spacer members hingedly connected to opposed sides of said base.

14. A filter unit having a filter medium in strip form arranged in zig-zag layers and comprising a base, and spacer elements having two spaced-apart strip supporting surfaces, the spacer elements being hingedly connected to opposed sides of said base.

VERNER DAHLMAN.